United States Patent
Tung (10) Patent No.: US 9,445,223 B2
(45) Date of Patent: Sep. 13, 2016

(54) PORTABLE ELECTRONIC DEVICE, SERVER AND CONNECTION METHOD THEREOF

(71) Applicant: Wistron Corporation, New Taipei (TW)

(72) Inventor: Kuang-Hao Tung, New Taipei (TW)

(73) Assignee: Wistron Corporation, New Taipei (TW)

(*) Notice: Subject to any disclaimer, the term of this patent is extended or adjusted under 35 U.S.C. 154(b) by 0 days.

(21) Appl. No.: 14/667,699

(22) Filed: Mar. 25, 2015

(65) Prior Publication Data

US 2016/0183036 A1    Jun. 23, 2016

(30) Foreign Application Priority Data

Dec. 23, 2014   (TW) .............................. 103144982 A (51) Int. Cl.
| | | |
|---|---|---|
| H04B 5/00 | (2006.01) | |
| H04B 7/00 | (2006.01) | |
| H04W 4/00 | (2009.01) | |
| H04W 76/02 | (2009.01) | |
| H04W 40/24 | (2009.01) | |
| H04L 29/06 | (2006.01) | |

(52) U.S. Cl.
CPC .............. *H04W 4/008* (2013.01); *H04L 69/22* (2013.01); *H04W 40/244* (2013.01); *H04W 76/023* (2013.01)

(58) Field of Classification Search
CPC ................................................... H04W 4/008
USPC ....................... 455/3.01, 3.06, 3.05; 370/254
See application file for complete search history.

(56) References Cited

U.S. PATENT DOCUMENTS

| | | | |
|---|---|---|---|
| 2003/0191818 A1 | 10/2003 | Rankin et al. | |
| 2007/0206554 A1* | 9/2007 | Laroia ................. | H04W 40/244 370/338 |
| 2007/0211680 A1* | 9/2007 | Laroia ................. | H04W 40/244 370/338 |
| 2010/0054154 A1* | 3/2010 | Lambert ........... | H04L 29/12311 370/254 |
| 2014/0220883 A1* | 8/2014 | Emigh .................. | H04H 20/61 455/3.01 |

OTHER PUBLICATIONS

"Office Action of Taiwan Counterpart Application," issued on Dec. 22, 2015, with English translation thereof, p. 1-9.

* cited by examiner

*Primary Examiner* — Tilahun B Gesesse
(74) *Attorney, Agent, or Firm* — Jianq Chyun IP Office (57) ABSTRACT

A portable electronic device including a network unit and a processing unit is provided. The processing unit is connected to the network unit. The processing unit determines whether a beacon is received through the network unit wirelessly. If the processing unit receives the beacon through the network unit, the processing unit parses the beacon to derive a network address of a server. The processing unit transmits a connection request to the server according to the network address through the network unit. The processing unit establishes a connection with the server through the network unit when receiving a confirmation signal in response to the connection request.

9 Claims, 5 Drawing Sheets

PORTABLE ELECTRONIC DEVICE, SERVER AND CONNECTION METHOD THEREOF

CROSS-REFERENCE TO RELATED APPLICATION

This application claims the priority benefit of Taiwan application Ser. No. 103144982, filed on Dec. 23, 2014. The entirety of the above-mentioned patent application is hereby incorporated by reference herein and made a part of this specification.

BACKGROUND

1. Technical Field

The invention relates to an electronic device, and particularly relates to a portable electronic device and a connection method thereof, and a server and a connection method thereof.

2. Related Art

Along with development of technology, people increasingly rely on networks and electronic devices. In the Internet, regarding an Internet service provider with certain scale, in order to improve user experiences of all of the users (or in order to prevent gaps of the user experiences between different users), the Internet service provider generally provides a plurality of servers having the same service functions, and diverts user's requests to different servers according to a network flow distribution and a data load balance of the servers. Regarding a current technique for the aforementioned network flow distribution and data load balance, besides it has to rent a service of content delivery network from other system service provider, the network service provider is also required to set up a server proxy for the servers to receive user's requests, and switch the connected server according to an existing flow of each of the servers. However, such practice may result in a fact that the user is connected to a very distant server (for example, the user is located in Taiwan, though the user is forced to connect a server in other country due to the aforementioned mechanism) to cause a slow connection, such that the user experience is not improved as expected. Moreover, although the user's requests are diverted when the user is connected to the server, the user's requests are still required to flow through the server proxy for further diversion. Therefore, when the server proxy cannot bear a present flow, it may cause a whole service shut down.

SUMMARY

The invention is directed to a portable electronic device and a connection method thereof, and a server and a connection method thereof, by which flow distribution and data load balance of servers are implemented without using a server proxy.

The invention provides a portable electronic device including a network unit and a processing unit. The processing unit is coupled to the network unit. The processing unit receives a beacon through the network unit wirelessly, and parses the beacon to derive a network address corresponding to a server. The processing unit transmits a connection request to the server according to the network address through the network unit. The processing unit establishes a connection with the server through the network unit when receiving a confirmation signal in response to the connection request.

The invention provides a connection method, which is adapted to a portable electronic device, and the connection method includes following steps. A beacon is receives wirelessly, and the beacon is parsed to derive a network address corresponding to a server. Then, a connection request is transmitted to the server according to the network address. A connection with the server is established when a confirmation signal is received in response to the connection request.

The invention provides a server including a network unit and a processing unit. The processing unit receives a connection request from a portable electronic device through the network unit, where the connection request is generated by the portable electronic device according to a beacon. The processing unit decodes a user identifier in the connection request, and determines whether the user identifier is correct. When the user identifier is correct, the processing unit transmits a confirmation signal through the network unit to establish a connection with the portable electronic device.

The invention provides a connection method, which is adapted to a server, the connection method includes following steps. First, a connection request is received from a portable electronic device, where the connection request is generated by the portable electronic device according to a beacon. Then, a user identifier in the connection request is decoded, and it is determined whether the user identifier is correct. Then, when the user identifier is correct, a confirmation signal is transmitted to establish a connection with the portable electronic device.

According to the above descriptions, the portable electronic device can be connected to the corresponding server according to the beacon received from external, such that the portable electronic device can be connected to different servers corresponding to the same services according to different locations thereof, and the servers corresponding to the same services can implement flow distribution and data load balance between the servers without using a server proxy.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
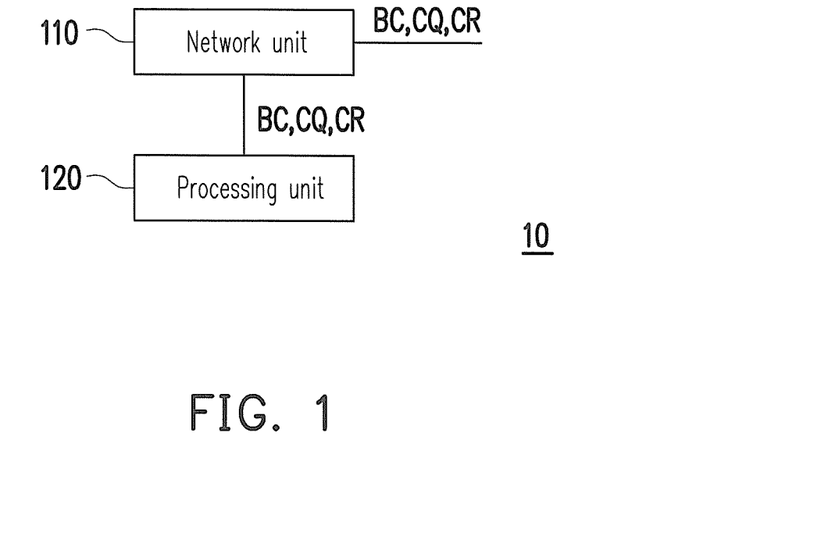
FIG. 1 is a block diagram of a portable electronic device according to an embodiment of the invention.

FIG. 1 is a block diagram of a portable electronic device according to an embodiment of the invention. Referring to FIG. 1, in the present embodiment, the portable electronic device 10 at least includes a network unit 110 and a processing unit 120. The processing unit 120 is coupled to the network unit 110. The processing unit 120 receives a beacon BC through the network unit 110 wirelessly, and parses the beacon BC to derive a network address corresponding to a server (for example, an Internet protocol address of the server or a domain name of the server). The processing unit 120 transmits a connection request CQ to the server according to the network address of the server through the network unit 110. When the processing unit 120 receives a confirmation signal CR in response to the connection request CQ, the processing unit 120 establishes a connection with the server through the network unit 110.

Figure 2:
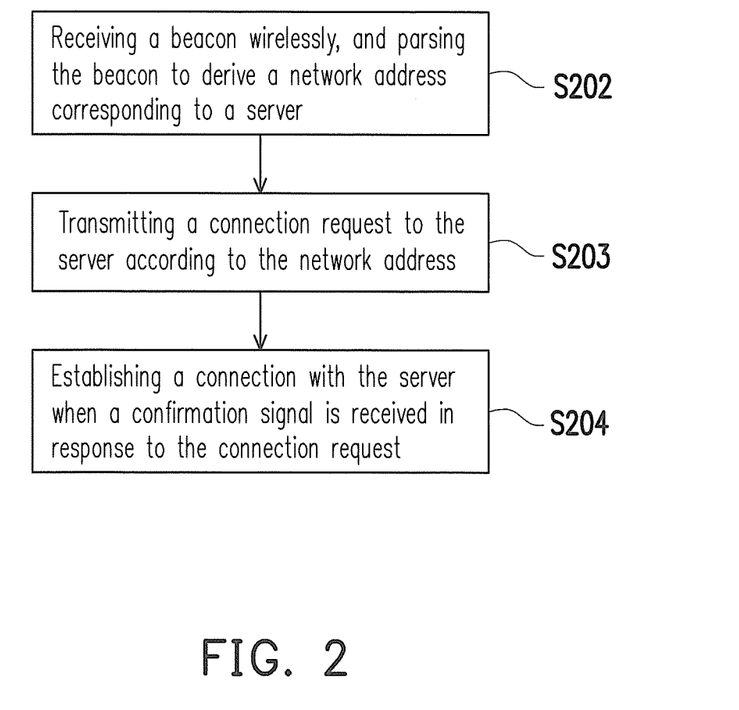
FIG. 2 is a flowchart illustrating a connection method according to an embodiment of the invention.

FIG. 2 is a flowchart illustrating a connection method according to an embodiment of the invention. The connection method is adapted to a portable electronic device (for example, the portable electronic device 10 of FIG. 1). Referring to FIG. 2, in step S202, a beacon is received wirelessly, and the beacon is parsed to derive a network address corresponding to a server. Then, in step S203, a connection request is transmitted to the server according to the network address. In step S204, a connection with the server is established when a confirmation signal is received in response to the connection request.

Figure 3:
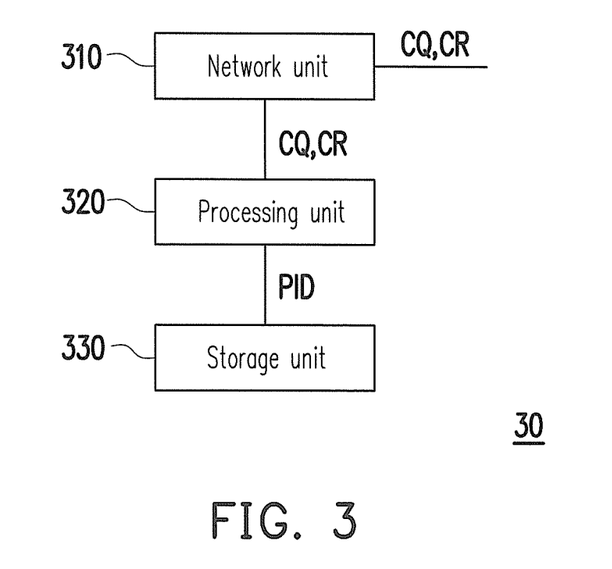
FIG. 3 is a functional block diagram of a server according to an embodiment of the invention.

On the other hand, FIG. 3 is a functional block diagram of a server according to an embodiment of the invention. Referring to FIG. 3, the server 30 includes at least a network unit 310 and a processing unit 320. The processing unit 320 receives a connection request CQ from a portable electronic device (for example, the portable electronic device 10 of FIG. 1) through the network unit 310, where the connection request CQ is generated by the portable electronic device 10 according to a beacon. The processing unit 320 decodes a user identifier in the connection request CQ, and determines whether the user identifier is correct. When the user identifier is correct, the processing unit 320 transmits a confirmation signal CR through the network unit 310 to establish a connection with the portable electronic device 10.

In an embodiment of the invention, the server 30 further includes a storage unit 330 coupled to the processing unit 320. The storage unit 330 stores predetermined beacon identification information PID. When the processing unit 320 deter lines whether the user identifier is correct, the processing unit 320 decodes the user identifier to obtain beacon identification information. The processing unit 320 obtains the predetermined beacon identification information PID from the storage unit, and compares the beacon identification information with the predetermined beacon identification information PID, and when the beacon identification information is the same to the predetermined beacon identification information PID, the processing unit 320 determines that the user identifier is correct.

Figure 4:
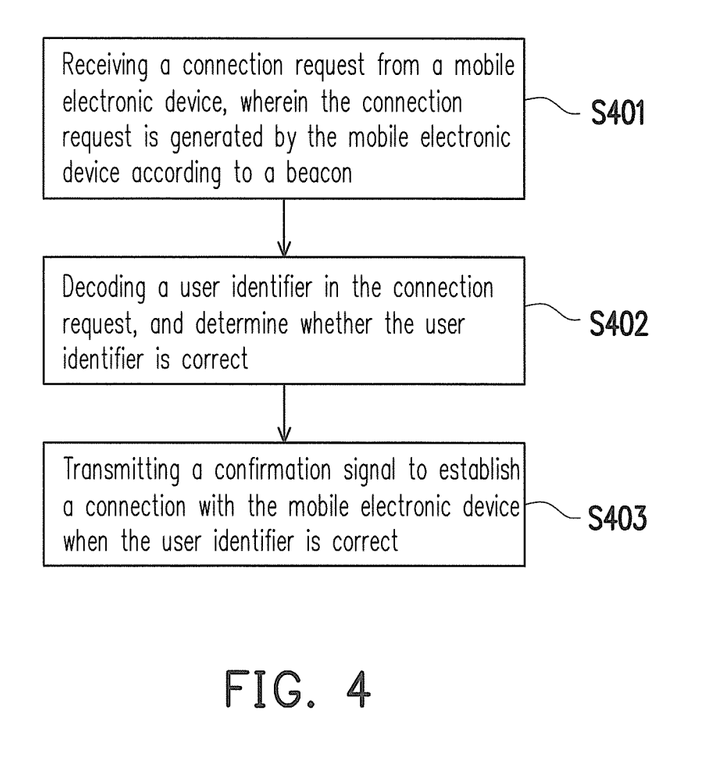
FIG. 4 is a flowchart illustrating a connection method according to an embodiment of the invention.

FIG. 4 is a flowchart illustrating a connection method according to an embodiment of the invention. The connection method of FIG. 4 is adapted to a server (for example, the server 30 shown in FIG. 3). Referring to FIG. 4, in step S401, a connection request is received from a portable electronic device, where the connection request is generated by the portable electronic device according to a beacon. Then, in step S402, a user identifier in the connection request is decoded, and it is determined whether the user identifier is correct. Then, in step s403, when the user identifier is correct, a confirmation signal is transmitted to establish a connection with the portable electronic device.

In the invention, the aforementioned server (the server 30 shown in FIG. 3) may correspond to a network service, for example, an audio/video streaming service, an online audio/video file conversion service, a webpage service, or an online shopping service. In order to provide such network service, a service provider may probably set up a plurality of servers that are identical to the server 30 of FIG. 3. After the connection between the portable electronic device (the portable electronic device 10 of FIG. 1) and the server (for example, the server 30 of FIG. 3) is established, the network service can be started, for example, to transmit audio/video streaming, a processed audio/video file, webpage data or a check list, etc. to the portable electronic device 10 (i.e. one of a plurality of users using the above service) in response to user's request.

In brief, when the user of the portable electronic device 10 wants to use such network service, for example, when the user selects an application corresponding to such network service through an input/output unit (for example, a physical key or a touch screen, etc., which is not shown in FIG. 1) of the portable electronic device 10, the processing unit 120 of the portable electronic device 10 can determine whether any beacon BC corresponding to the network service is received through the network unit 110. If the beacon BC corresponding to the network service is received through the network unit 110, the processing unit 120 can connect to the server (for example, the server 30 of FIG. 3) according to a network address of the server included in the beacon BC.

Figure 5:
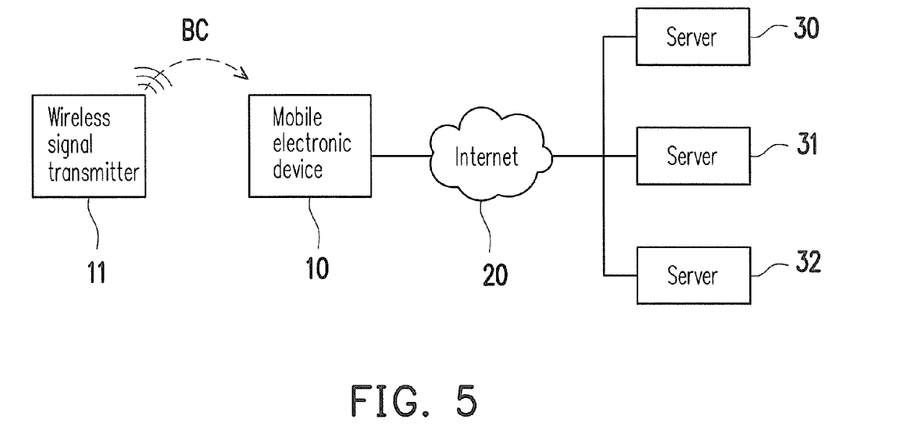
FIG. 5 is a schematic diagram when a portable electronic device is connected to a server through the Internet according to an embodiment of the invention.

The beacon BC can be preset in a plurality of wireless signal transmitters by the network service provider. The wireless signal transmitters can be set at fixed positions, and keep broadcasting within a signal coverage range of the wireless signal transmitters. FIG. 5 is a schematic diagram when a portable electronic device is connected to a server through the Internet according to an embodiment of the invention. Referring to FIG. 5, the portable electronic device 10 obtains the beacon BC from a wireless signal transmitter 11 set at a fixed position, and obtains a network address (for example, a MAC address, an IP address or a domain name) of one of the servers 30-32 corresponding to the network service from the beacon BC. In this way, the portable electronic device 10 can be connected to one of the servers 30-32 to start the network service through the Internet 20 by using the aforementioned network address.

Figure 6:
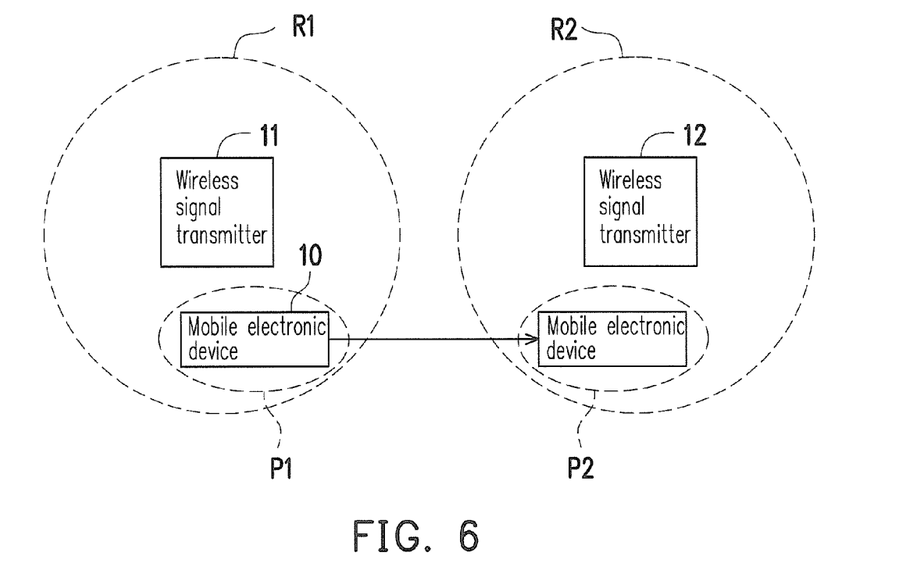
FIG. 6 is a schematic diagram illustrating a position relationship of wireless signal transmitters and a portable electronic device according to an embodiment of the invention.

Regarding the wireless signal transmitters (for example, the wireless signal transmitter 11 of FIG. 5) set at a plurality of different fixed positions, the network service provider can respectively write the same or different network addresses of the servers therein according to the fixed positions thereof. For example, FIG. 6 is a schematic diagram illustrating a position relationship of wireless signal transmitters and a portable electronic device according to an embodiment of the invention. Referring to FIG. 6, the beacon transmitted by the wireless signal transmitter 11 includes network address information corresponding to one server, and the beacon transmitted by the wireless signal transmitter 12 includes network address information corresponding to another server, for example, the server 30 and the server 31 shown in FIG. 5.

When the portable electronic device 10 is located at a position P1, since the position P1 is located within a signal coverage range R1 of the wireless signal transmitter 11, the user of the portable electronic device 10 activates the application corresponding to the network service, then the portable electronic device 10 can be connected to the server (for example, the server 30 of FIG. 5) according to the beacon received from the wireless signal transmitter 11. When the portable electronic device 10 is moved from the position P1 to the position P2, since the position P2 is located within a signal coverage range R2 of the wireless signal transmitter 12, the user of the portable electronic device 10 activates the application corresponding to the network service, then the portable electronic device 10 can update the network address of the server to be connected to another server (for example, the server 31 of FIG. 5) according to the beacon received from the wireless signal transmitter 11, and is connected to another server instead.

When the portable electronic device 10 is not located within the signal coverage range of any wireless signal transmitter (for example, located outside the signal coverage ranges R1-R2 of the wireless signal transmitters 11-12), the portable electronic device 10 can select to connect a predetermined server (for example, a network address of the predetermined server is pre-written to the application of the corresponding network service), or select to connect the server corresponding to the network address included in the previously obtained beacon. For example, when the portable electronic device 10 moves from the position P1 to a position outside the signal coverage ranges R1-R2, and the user of the portable electronic device 10 again activates the application corresponding to the network service, the portable electronic device 10 can connect to the server (for example, the server 50 shown in FIG. 5) corresponding to the network address included in the beacon obtained from the wireless signal transmitter 11.

On the other hand, the beacon can be any signal or packet suitable for wireless broadcasting as long as it can be successfully received and parsed by the network unit 110 of the portable electronic device 10. The aforementioned fixed positions can be positions where the network service provider expects the users to use the network service. For example, in case that the network service provider provides an internal network service for an enterprise, the fixed positions can be different floors in an office building where the enterprise is located. In case that the network service provider is a local online audio/video streaming provider, the fixed positions can be laid in each of the communities. In case that the network service provided by the network service provider is for general publics, the fixed positions can be locations where the general publics often pass by such as bus stops, convenience stores, stations, etc. Along with the aforementioned different implementations, the network service provider may select wireless signals complied with standards of different powers or signal coverage ranges according to requirements of the aforementioned implementations, which is not limited by the invention.

For example, the beacon can be a beacon complied with a wireless fidelity (WiFi) standard, or a broadcasting data packet complied with a bluetooth standard. In an embodiment of the invention, the beacon is a broadcasting packet complied with a bluetooth low energy (BLE) standard, for example, an iBeacon complied with the BLE standard. Regarding a data format of the iBeacon, at least data content such as beacon identification information (for example, a universal unique identity (UUID) is recorded therein), a major field, a minor field, and a measured power, etc. are included.

The portable electronic device 10 can use the aforementioned UUID to identify whether the received beacon corresponds to the aforementioned network service. The major field and the minor field respectively have 16 bits, which can be freely defined by a designer. In the present embodiment, the network service provider disassembles the network address of the servers (for example, one of the servers 30-32) into two information segments for filling in the major field and the minor field, or even encodes the network address and then disassembles the same for filling in the major field and the minor field, such that the information (for example, first information and second information) filled in the major field and the minor field may have an encryption effect or an anti-error effect. After the portable electronic device 10 receives the beacon, the portable electronic device 10 can obtain the network address of the server according to a method opposite to the aforementioned method (for example, by simply combining the first information and the second information or performing decryption or decoding after combining the first information and the second information), which is not limited by the invention.

Moreover, in the present embodiment, the portable electronic device 10 (or specifically, the processing unit 120 of the portable electronic device 10) can also parse the beacon complied with BLE standard to derive a field of the measured power to obtain power information, and outputs a notification though the output unit according to the power information. For example, the power information may include "immediate", "nearby" (about 1 meter) or "far" (more than 1 meter). When the distance is too far to be deduced, the field of the power information is filled with the value of "far". When the processing unit 120 of the portable electronic device 10 obtains the power information of "far", the portable electronic device 10 can output a notification though an output unit (not shown, for example, a liquid crystal display, or a speaker) of the portable electronic device 10 to notify the user that the portable electronic device 10 is currently not within the signal coverage range of any wireless signal transmitter, and the processing unit 120 of the portable electronic device 10 connects a predetermined server or a server corresponding to the network address included in the previously obtained beacon.

Figure 7:
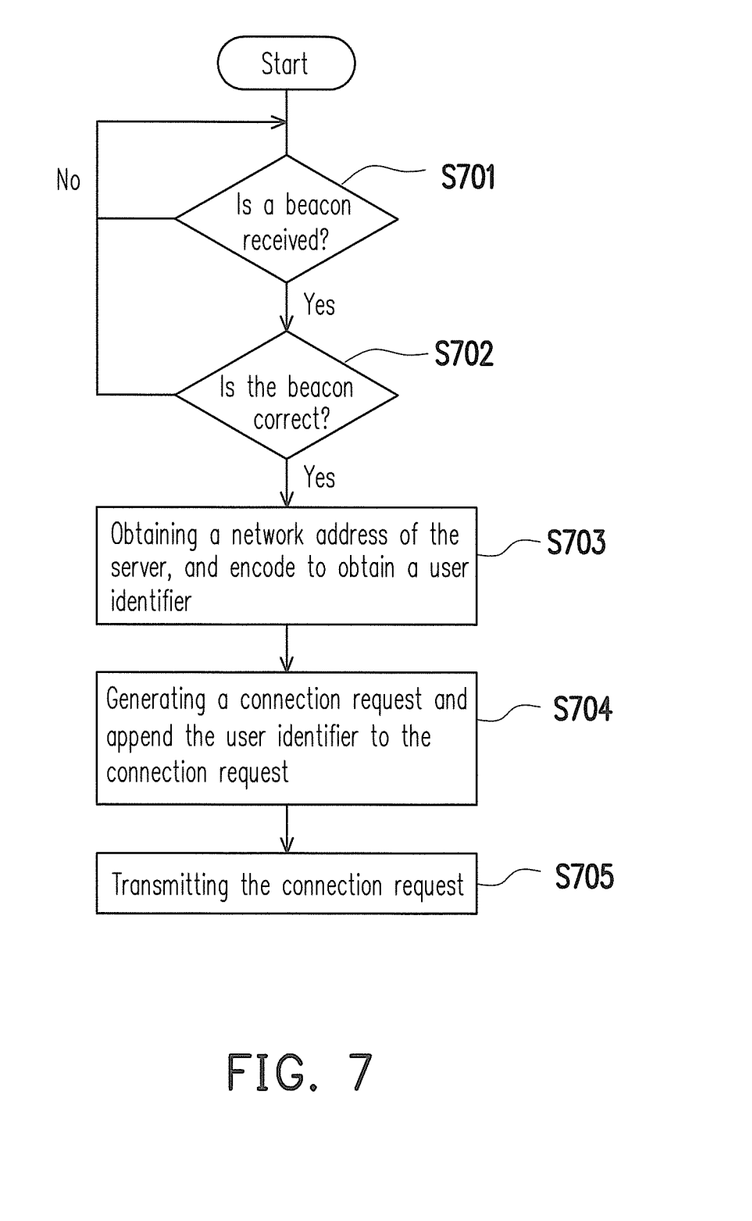
FIG. 7 is a flowchart illustrating a connection method adapted to a portable electronic device according to an embodiment of the invention.

FIG. 7 is a flowchart illustrating a connection method adapted to a portable electronic device according to an embodiment of the invention. Compared to the embodiment of the connection method depicted in FIG. 2, the connection method of FIG. 7 provides more implementation details. Referring to FIG. 1 and FIG. 7, first, the processing unit 120 of the portable electronic device 10 continuously determines whether any beacon BC is received through the network unit 110 (step S701). When the processing unit 120 receives the beacon BC through the network unit 110, the processing unit 120 further verifies whether the beacon BC is correct (step S702). In the present embodiment, the processing unit 120 captures the UUID in the beacon BC to determine whether the received beacon BC corresponds to the network service. However, the invention is not limited to the aforementioned determination method.

If the processing unit 120 determines that the beacon BC is not correct (step S702, no), the processing unit 120 discards the beacon BC, and continuously determines whether any beacon BC is received through the network unit 110. If the beacon BC is correct, the processing unit 120 obtains a network address of the server from the beacon BC (as described above, after the first information and the second information are obtained from a first field and a second field (the fieldmajor field and the fieldminor field), the first information and the second information are combined (or combined and further decoded) to obtain the network address of the server). Moreover, the processing unit 120 encodes the UUID according to an encoding method to obtain a user identifier (step S703). The encoding method can be any encryption encoding algorithm as long as the server has the corresponding decoding capability, and the encoding method is not limited by the invention. After obtaining the user identifier, the processing unit 120 generates a connection request CQ, and adds the user identifier to the connection request CQ (step S704). Then, the processing unit 120 transmits the connection request CQ to the server according to the network address of the server (step S705).

Figure 8:
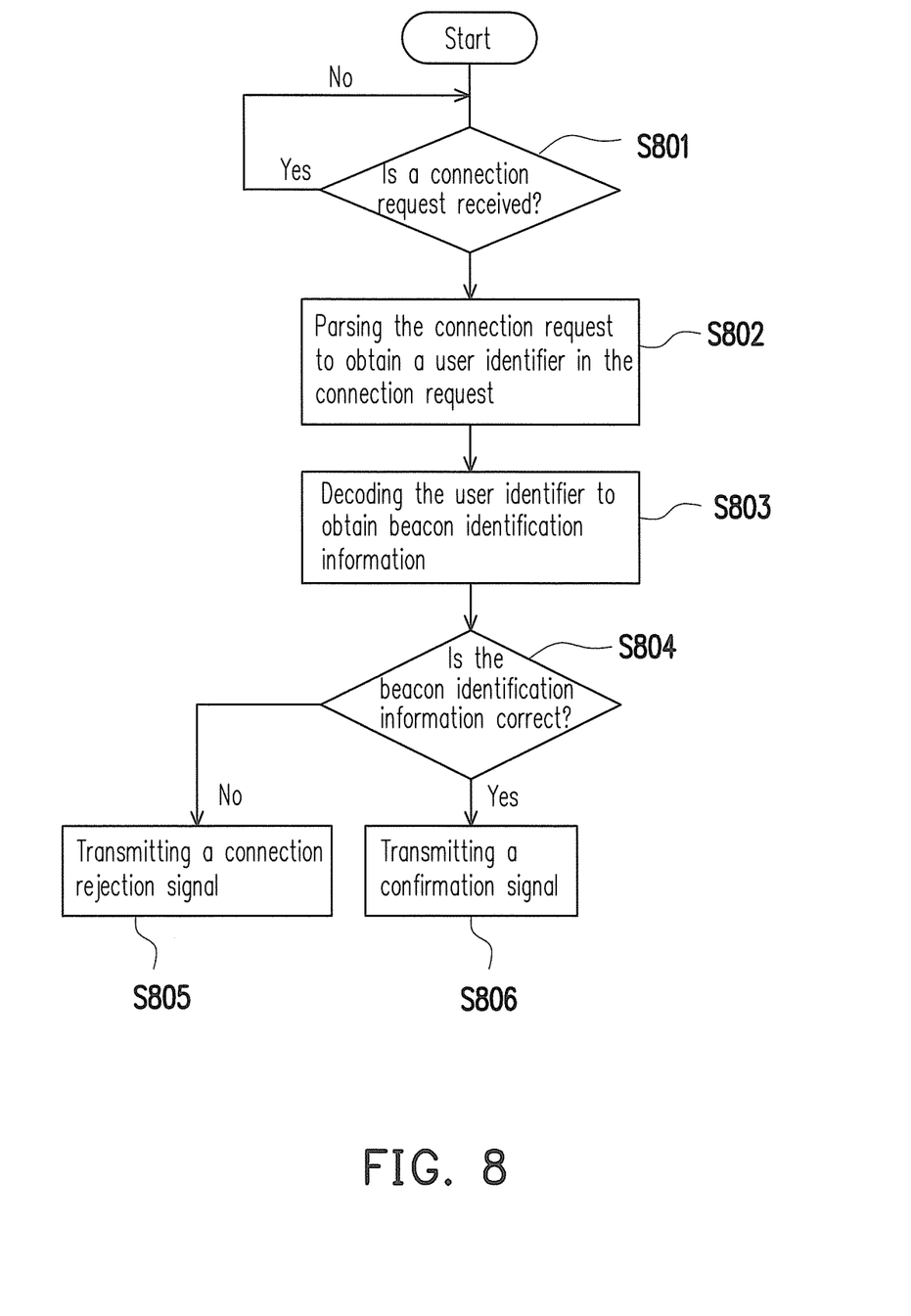
FIG. 8 is a flowchart illustrating a connection method adapted to a server according to an embodiment of the invention.

FIG. 8 is a flowchart illustrating a connection method adapted to a server according to an embodiment of the invention. The embodiment of FIG. 8 corresponds to a connection method flow of the server in the embodiment of FIG. 7. Referring to FIG. 3 and FIG. 8, the processing unit 320 of the server 30 continuously determines whether the connection request CQ is received form a portable electronic device (for example, the portable electronic device 10 of FIG. 1) through the network unit 310 (step S801). When the processing unit 320 receives the connection request CQ through the network unit 310 (the step S801, yes), the processing unit 320 further parses the connection request CQ, and obtains a user identifier form the connection request CQ (step S802). In the present embodiment, the processing unit 320 decodes the user identifier to obtain the beacon identification information (i.e. the UUID) by using a decoding method, where the decoding method corresponds to the encoding method that the portable electronic device 10 encodes the UUID to obtain the user identifier (step S803). Then, the processing unit 320 determines whether the beacon identification information is correct through a comparison manner (for example, to compare with predetermined beacon identification information stored in the storage unit 330) (step S804). If the beacon identification information obtained from the connection request CQ is error, the processing unit 320 transmits back a connection rejection signal to the portable electronic device (for example, the portable electronic device 10 of FIG. 1) through the network unit 310.

If the processing unit 320 determines that the beacon identification information obtained from the connection request CQ is correct, the processing unit 320 transmits a confirmation signal CR to the portable electronic device 10 through the network unit 310, such that the portable electronic device 10 further establishes a connection with the server 30 through a connection procedure (step S806), and the network service can be provided to the portable electronic device 10 through the connection.

In summary, the invention provides a portable electronic device and a connection method thereof, and a server and a connection method thereof. As the beacon broadcasted at fixed positions carries the connection information corresponding to the network service, the network service provider can implement network flow distribution and data load balance between the servers without using a server proxy. In this way, not only operating cost is saved, interruption of the network service caused by non-operation of the server proxy is also avoided.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A portable electronic device, comprising:
   a network unit; and
   a processing unit, coupled to the network unit,
   wherein the processing unit receives a beacon through the network unit wirelessly, and parses the beacon to derive a network address corresponding to a server,
   the processing unit parses the beacon to obtain beacon identification information, the processing unit verifies whether the beacon identification information is correct,
   when the beacon identification information is correct, the processing unit parses the beacon to obtain the network address corresponding to the server, and encodes the beacon identification information to generate a user identifier,
   the processing unit adds the user identifier to a connection request,
   the processing unit transmits the connection request to the server according to the network address through the network unit, and the processing unit establishes a connection with the server through the network unit when receiving a confirmation signal in response to the connection request.

2. The portable electronic device as claimed in claim 1, wherein the processing unit respectively obtains first information and second information from a first field and a second field of the beacon, and parses the first information and the second infonnation to obtain the network address.

3. The portable electronic device as claimed in claim 2, wherein the beacon is a broadcasting packet complied with a bluetooth low energy (BLE) standard, the first field is a major field in the beacon, and the second field is minor field in the beacon.

4. The portable electronic device as claimed in claim 1, further comprising:
   an output unit, wherein the processing unit parses the beacon to obtain power information, and outputs a notification through the output unit according to the power information.

5. A connection method, adapted to a portable electronic device, comprising:
   receiving a beacon wirelessly, and parsing the beacon to derive a network address corresponding to a server;
   parsing the beacon to obtain beacon identification information;
   verifying whether the beacon identification information is correct;
   when the beacon identification information is correct, parsing the beacon to obtain the network address corresponding to the server, and encoding the beacon identification information to generate a user identifier;
   adding the user identifier to a connection request;
   transmitting the connection request to the server according to the network address; and
   establishing a connection with the server when a confirmation signal is received in response to the connection request.

6. The connection method as claimed in claim 5, wherein the step of parsing the beacon to derive the network address corresponding to the server comprises:

respectively obtaining first information and second information from a first field and a second field of the beacon, and parsing the first information and the second information to obtain the network address.

7. The connection method as claimed in claim 6, wherein the beacon is a broadcasting packet complied with a bluetooth low energy (BLE) standard, the first field is a major field in the beacon, and the second field is minor field in the beacon.

8. The connection method as claimed in claim 5, further comprising:
   parsing the beacon to obtain power information, and outputting a notification according to the power information.

9. A server, comprising:
   a network unit;
   a processing unit; and
   a storage unit, coupled to the processing unit, and storing predetermined beacon identification information,
   wherein the processing unit receives a connection request from a portable electronic device through the network unit, wherein the connection request is generated by the portable electronic device according to a beacon, the processing unit decodes a user identifier in the connection request, and determines whether the user identifier is correct, and when the user identifier is correct, the processing unit transmits a confirmation signal through the network unit to establish a connection with the portable electronic device,
   wherein the processing unit decodes the user identifier to obtain beacon identification information, the processing unit obtains the predetermined beacon identification information from the storage unit, and compares the beacon identification information with the predetermined beacon identification information, and when the beacon identification information is the same to the predetermined beacon identification information, the processing unit determines the user identifier to be correct.

\* \* \* \* \*